United States Patent [19]
Bell et al.

[11] Patent Number: 6,115,383
[45] Date of Patent: Sep. 5, 2000

[54] SYSTEM AND METHOD OF MESSAGE DISTRIBUTION IN A TELECOMMUNICATIONS NETWORK

[75] Inventors: Ronald Bradley Bell, Plano; Russell Richard Cook, Garland; Robin Lee Stege, Dallas; Robin Chenghai Gan, Plano, all of Tex.

[73] Assignee: Alcatel USA Sourcing, L.P., Plano, Tex.

[21] Appl. No.: 08/928,116

[22] Filed: Sep. 12, 1997

[51] Int. Cl.[7] ................................................. H04M 3/42
[52] U.S. Cl. .......................... 370/400; 370/229; 379/219; 379/269
[58] Field of Search ...................... 370/229, 230, 370/231, 232, 233, 234, 235, 236, 237, 400; 379/219, 220, 221, 229, 230, 268, 269

[56] References Cited

U.S. PATENT DOCUMENTS 5,719,930 2/1998 MacDonal et al. .................... 379/229
5,878,129 3/1999 Figurski et al. ........................ 370/229

Primary Examiner—Chi H. Pham
Assistant Examiner—Frank Duong
Attorney, Agent, or Firm—Baker Botts L.L.P.

[57] ABSTRACT

A signal transfer point (14) in a telecommunications network (10) distributes messages to a plurality of service control points (16) as a result of global title translation processing. The signal transfer point (14) assigns a message allocation to each of the service control points (16). The signal transfer point (14) equally distributes messages to the service control points (16) in a sequential manner. The signal transfer point (14) keeps track of the number of messages sent to each service control point (16). When a particular service control point (16) reaches its message allocation, the signal transfer point (14) prevents further messages to be sent to the particular service control point (16). The signal transfer point (14) then continues sequential and equal distribution to the remaining service control points (16) until each service control point (16) reaches its message allocation. The signal transfer point (14) then resets to send a next set of messages to the service control points (16). Message allocation is adjusted when any service control point (16) becomes unavailable.

14 Claims, 1 Drawing Sheet

SYSTEM AND METHOD OF MESSAGE DISTRIBUTION IN A TELECOMMUNICATIONS NETWORK

TECHNICAL FIELD OF THE INVENTION

The present invention relates in general to telecommunication signal processing and more particularly to a system and method of message distribution in a telecommunications network.

BACKGROUND OF THE INVENTION

Conventional signaling message distribution in a telecommunications network occurs between a signal transfer point and a service control point. Typically, a signal transfer point would send all of its signaling messages to a single service control point in a solitary routing back-up type configuration. If the single service control point failed, a back-up service control point would process all of the signaling messages from the signal transfer point. For a load share routing back-up type configuration, signaling message translations are alternated equally between two service control points. For a dominant replicate routing back-up type configuration, global title translations result in messages being sent to the first available service control point, typically among a group of four service control points. These configurations still run into problems with regard to congestion and reliability. With the growing amount of service control point services and service transactions within the telecommunications network, many customers have the need for more flexible and customized network engineering capabilities to reduce the possibilities of congestion and reliability. Therefore, it is desirable to provide an improved routing back-up type configuration to meet the increased demands of telecommunications customers.

SUMMARY OF THE INVENTION

From the foregoing, it may be appreciated that a need has arisen for a message distribution technique that provides increased capabilities to meet customer needs. In accordance with the present invention, a system and method of message distribution in a telecommunications network are provided that substantially eliminate or reduce disadvantages and problems associated with conventional message routing schemes.

According to an embodiment of the present invention, there is provided a method of message distribution in a telecommunications network that includes assigning a message allocation to each of a plurality of processing nodes and subsystems serviced by each processing node. Messages are then distributed equally among each of the plurality of processing nodes. The number of messages sent to each of the processing nodes and subsystems service by a processing node is counted and message distribution to a particular processing node and subsystem is prevented once the message allocation for the particular processing node and subsystem has been reached. Subsequently, message distribution continues equally among those processing nodes and subsystems that have not reached their respective message allocation.

The present invention provides various technical advantages over conventional message distribution schemes. For example, one technical advantage is in assigning message allocations for each subsystem service by each processing node. Another technical advantage is to provide equal distribution to processing nodes and subsystems that have not reached their message allocation. Yet another technical advantage is to readjust the message distribution procedure in the event of a failure in a processing node or subsystem. Still another technical advantage is to allow full utilization of service control points within a network that provide for multiple subsystems and thus handling of multiple service applications. Other technical advantages may be readily apparent to those skilled in the art from the following figures, description, and claims.

BRIEF DESCRIPTION OF THE DRAWINGS

For a more complete understanding of the present invention and the advantages thereto, reference is now made to the following description taken in conjunction with the accompanying drawings, wherein like reference numerals represent like parts, in which.

DETAILED DESCRIPTION OF THE INVENTION

Figure 1:
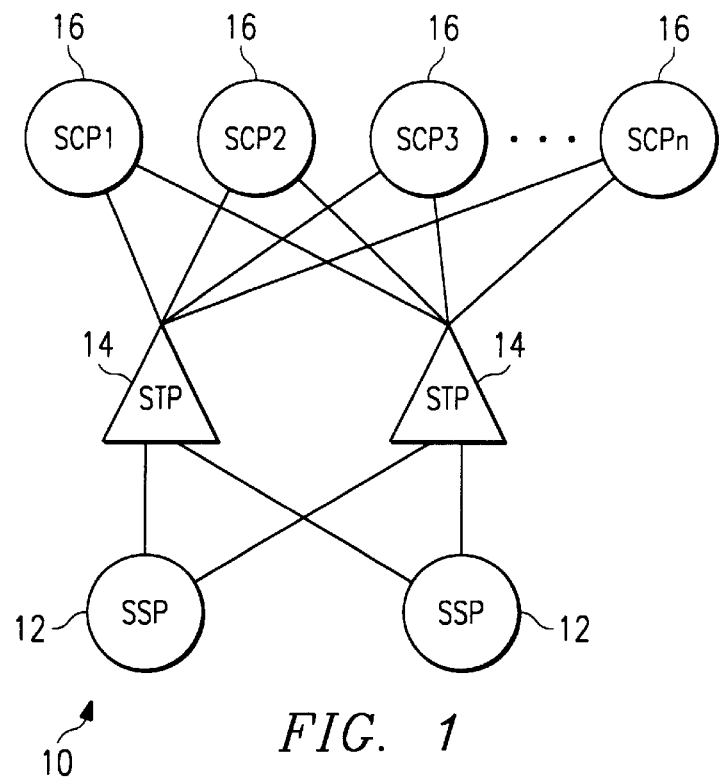
FIG. 1 illustrates a simplified block diagram of a telecommunications network.

The FIGURE shows a simplified block diagram of a telecommunications network 10. Telecommunications network 10 includes one or more service switching points 12, one or more signal transfer points 14, and one or more service control points 16. Service switching points 12 process telecommunications traffic within telecommunications network 10. Service switching point 12 identifies telecommunications traffic that requires special handling for intelligent network provisioning. Upon identifying telecommunications traffic that requires special handling, service switching point sends messages to be translated to service control point 16 through signal transfer point 14 for obtaining call handling information from service control point 16 in order to properly route the telecommunications traffic.

Signal transfer point 14, acting as global title translation processing nodes implements a message distribution technique in order to pass messages among service control points 16. In response to a message received from signal transfer point 14, service control point 16 routes the message to a subsystem handling a specific service within service control point 16 and generates the call handling information for return to service switching point 12 through signal transfer point 14. Signal transfer point 14 is responsible for appropriately distributing messages among the plurality of service control points 16 and subsystems and returning the call handling information generated by service control points 16 to service switching points 12. Signal transfer point 14 performs message distribution according to a predetermined distribution scheme that may be dynamically adjusted in response to changes occurring within telecommunications network 10.

Distribution schemes that may be implemented by signal transfer point 14 include a weighted load share routing back-up type configuration and a shared replicate routing back-up type configuration. The weighted load share routing back-up type configuration implements a weight factor technique to apportion messages from each signal transfer point 14 to subsystems serviced by service control points 16. The shared replicate routing back-up type configuration uses primary and secondary service control points 16 and subsystems with apportionment occurring to secondary service control points and subsystems upon a failure or unavailability of a primary service control point 16.

The weighted load share routing back-up type configuration provides translation to all available processing nodes within a global title translation destination group based on a weight factor. The weight factor determines a percent of messages sent by signal transfer point 14 as a result of global title translation to a particular subsystem at a particular processing node within the global title translation destination group. During normal operation, signal transfer point 14 sends messages as a result of global title translation designated subsystems at each processing node it is able to access. Message allocation is dynamically adjusted when processing nodes or subsystems become unavailable to signal transfer point 14, for example, as a result of a processing node failure, subsystem failure, or other event causing unavailability. Table 1 shows an example of the weighted load share routing back-up type configuration for an eight processing node destination group implementation and routing as a result of various processing node availabilities. Table 1 shows an example where each processing node contains only a single subsystem.

apportioned among the remaining available processing nodes. The following formula is used to determine the additional percent of message load that is to be added to a particular available processing node in response to an unavailable processing node:

$$z=(x*y)/(t1*t2)$$

where, t1=total weight of all processing nodes within a group,
t2=total weight of all processing nodes within a group minus total weight of unavailable processing nodes,
x=total weight of all unavailable processing nodes,
y=total weight of a particular available processing node,
z=total percentage of traffic load to be added to particular available processing node.

Consider the example of Table 1 where processing nodes scp1 and scp2 become unavailable. In order to determine the effect of the unavailability of scp1 and scp2 on processing node scp4, equation 1 yields a value of 200 (total weight of

TABLE 1

Weighted Load Share Example

| node/s sn | Original Weight Factor | Original Traffic Load | New Traffic Load | New Traffic Load | New Traffic Load | New Traffic Load | New Traffic Load | New Traffic Load | New Traffic Load | New Traffic Load | New Traffic Load |
|---|---|---|---|---|---|---|---|---|---|---|---|
| scp1 | 40 | 20% | unavailable | unavailable | unavailable | unavailable | unavailable | unavailable | unavailable | 80% 160 | 57% 14 |
| scp2 | 40 | 20% | 25% 50 | unavailable | unavailable | unavailable | unavailable | unavailable | unavailable | unavailable | unavailable |
| scp3 | 40 | 20% | 25% 50 | 33% 66 | unavailable | unavailable | unavailable | unavailable | unavailable | unavailable | unavailable |
| scp4 | 20 | 10% | 12.5% 25 | 17% 34 | 25% 50 | unavailable | unavailable | unavailable | unavailable | unavailable | 29% 58 |
| scp5 | 20 | 10% | 12.5% 25 | 17% 34 | 25% 50 | 33% 66 | unavailable | unavailable | unavailable | unavailable | unavailable |
| scp6 | 20 | 10% | 12.5% 25 | 17% 34 | 25% 50 | 33% 66 | 50% 100 | unavailable | unavailable | unavailable | unavailable |
| scp7 | 10 | 5% | 6.25% 13 | 8% 16 | 12.5% 25 | 17% 34 | 25% 50 | 50% 100 | unavailable | unavailable | unavailable |
| scp8 | 10 | 5% | 6.25% 13 | 8% 16 | 12.5% 25 | 17% 34 | 25% 50 | 50% 100 | 100% 200 | 20% 40 | 14% 28 |
| Total | 200 | 100% | 100% | 100% | 100% | 100% | 100% | 100% | 100% | 100% | 100% |

The weighted load share feature provides that each processing within a destination group receives a non-zero percentage of the message load. Upon failure or other unavailability of a processing node, the load of the newly unavailable processing node is apportioned among the remaining available processing nodes. Table 1 shows that out of 200 messages to be sent from signal transfer point 14, 40 messages are to go to each of processing nodes scp1, scp2, and scp3, 20 messages are to go to each of processing nodes scp4, scp5, and scp6, and 10 messages are to go to each of processing nodes scp7 and scp8. Messages are sequentially sent to each processing node until a processing node has reached its allocation quota. After reaching its allocation quota, a processing node will not receive any other messages until the remaining processing nodes have received their allocation quotas or a processing node becomes unavailable during a 200 message set. Messages will again be sequentially sent to all processing nodes upon start of a next 200 message set until the processing nodes reach their respective allocation quotas.

Upon failure or other unavailability of a processing node, the message load for the unavailable processing node is all processing nodes) for t1, a value of 120 (total weight minus unavailable total weight) for t2, a value of 80 (unavailable total weight) for x, and a value of 20 (total weight of scp4) for y. This yields a total percent of load to be added to scp4 of z=6.7 percent. Thus, the message allocation for scp4 increases from its original weight factor of 20 to a new weight factor rounded off to 34 for a 200 message set. Upon the availability of a previously unavailable processing node, the message allocation is appropriately and dynamically adjusted to reflect the newly available processing node. Table 1 depicts this allocation adjustment for other processing nodes and other unavailability scenarios.

The shared replicate routing back-up type configuration provides translation to available primary processing nodes within a global title translation destination group based on a weight factor. The primary processing nodes may share message allocation based on a weight factor as discussed above. During normal operation, signal transfer point 14 sends messages as a result of global title translation to all primary processing nodes it is able to access. Message allocation is dynamically adjusted to secondary processing nodes or subsystems when primary processing nodes or subsystems become unavailable to signal transfer point 14, for example, as a result of a primary processing node failure, subsystem failure, or other event causing unavailability. Table 2 shows an example of the shared replicate load share routing back-up type configuration for an eight processing node destination group implementation and various processing node or subsystem availabilities.

counters maintained by signal transfer point 14 are incremented regardless of the routing back-up type configuration.

Figure 2:
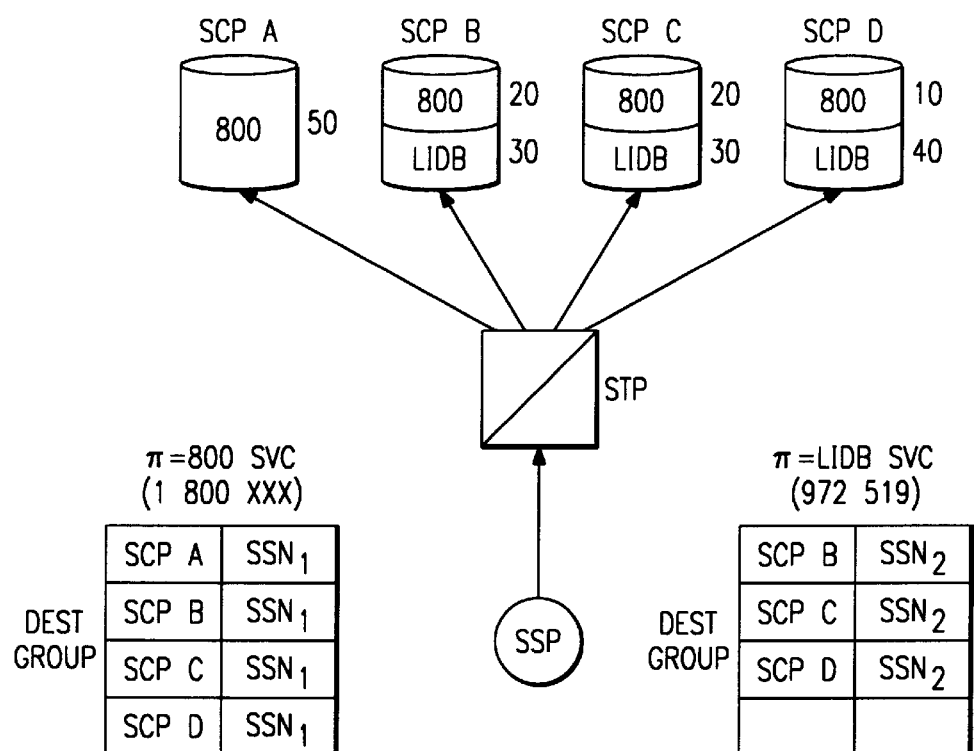
FIG. 2 illustrates an example of a message distribution scheme with multiple subsystems.

FIG. 2 shows an example of message distribution using multiple subsystems. Each processing node, in this case SCPA, SCPB, SCPC, and SCPD, services one or more subsystems. Each subsystem of a processing node handles messages associated with a particular service application of

TABLE 2

Shared Replicate Example

| node/s sn | Original Weight Factor | Original Traffic Load | New Traffic Load | New Traffic Load | New Traffic Load | New Traffic Load | New Traffic Load | New Traffic Load | New Traffic Load | New Traffic Load | New Traffic Load |
|---|---|---|---|---|---|---|---|---|---|---|---|
| scp1 | 60 (primary) | 30% | unavailable | unavailable | unavailable | unavailable | unavailable | unavailable | unavailable | 30% 60 | 30% 60 |
| scp2 | 60 (primary) | 30% | 30% 60 | unavailable | unavailable | unavailable | unavailable | unavailable | unavailable | unavailable | unavailable |
| scp3 | 40 (primary) | 20% | 20% 40 | 20% 40 | unavailable | unavailable | unavailable | unavailable | unavailable | unavailable | unavailable |
| scp4 | 40 (primary) | 20% | 20% 40 | 20% 40 | 20% 40 | unavailable | unavailable | unavailable | unavailable | unavailable | 20% 40 |
| scp5 | 0 (backup) | 0% | 7.5% 15 | 15% 30 | 20% 40 | 25% 50 | unavailable | unavailable | unavailable | unavailable | unavailable |
| scp6 | 0 (backup) | 0% | 7.5% 15 | 15% 30 | 20% 40 | 25% 50 | 33.3% 66 | unavailable | unavailable | unavailable | unavailable |
| scp7 | 0 (backup) | % | 7.5% 15 | 15% 30 | 20% 40 | 25% 50 | 33.3% 67 | 50% 100 | unavailable | unavailable | unavailable |
| scp8 | 0 (backup) | % | 7.5% 15 | 15% 30 | 20% 40 | 25% 50 | 33.3% 67 | 50% 100 | 100% 200 | 70% 140 | 50% 100 |
| Total | 200 | 100% | 100% | 100% | 100% | 100% | 100% | 100% | 100% | 100% | 100% |

One or more processing nodes within a global title translation destination group may have a percentage message allocation of zero as secondary processing nodes and one or more processing nodes may share message allocation as primary processing nodes. Upon failure or other unavailability of a primary processing node or subsystem, the message load of the unavailable primary processing node or subsystem is, preferably, equally apportioned among the available secondary processing nodes and subsystems. Though equal apportionment among secondary processing nodes is preferable, unequal apportionment schemes may also be implemented. A similar sequential distribution process, as discussed above, is employed until each processing node or subsystem reaches its message allocation quota. Message allocation is also dynamically adjusted upon the availability of a previously unavailable processing node and subsystem. Table 2 shows four primary processing nodes and four secondary processing nodes and various message allocations for differing processing node availabilities. Table 2 shows the example where each processing node contains only a single subsystem.

Signal transfer point 14 maintains a transport counter for each processing node within a global title translation destination group to keep track of the messages sent to the chosen processing nodes and subsystems using the sequential distribution scheme in order to determine whether message allocations have been reached. Signal transfer point 14 also has a failure counter for each processing node and to keep track of the processing nodes and subsystems chosen for message transport but were unavailable. More than one failure counter may be incremented by a single message based on the number of unavailable processing nodes or subsystems. Signal transfer point 14 also has a destination group counter to track when messages cannot be delivered due to unavailability of all processing nodes and subsystems within a destination group, indicating a routing failure. The the processing node. In the example shown in FIG. 2, the particular service application associated with a subsystem are toll free 800 service and line identification database (L1DB) service. An independent weighted load share routing back-up type configuration may be implemented for each subsystem. Though shown with only two subsystems, the weighted load share routing back-up type configuration may be implemented on any of a number of different subsystems as long as the total capacity for the processing node destination group is not exceeded. The example may also be extended to the shared replicate routing back-up type configuration.

In the example of FIG. 2, a 200 message set is considered with 100 messages destined for the 800 service application subsystem ($SSN_1$) and 100 messages destined for the L1DB service application subsystem ($SSN_2$). The weighted load share distribution for subsystem SSN1 has 50 messages for SCPA, 20 messages for SCPB, 20 messages for SCPC, and 10 messages for SCPD. The weighted load share distribution for subsystem SSN2 has 0 messages for SCPA, 30 messages for SCPB, 30 messages for SCPC, and 40 messages for SCPD. As global title translation is performed, signal transfer point 14 identifies subsystem SSN1 messages to be sent to the processing nodes according to a destination group table for subsystem SSN1. Signal transfer point 14 sequentially sends messages to SCPA, SCPB, SCPC, and SCPD, keeping track of the number of messages sent to each processing node, and preventing transmission of messages to a particular processing node that has reached its message allocation until the next message set. Similarly, signal transfer point 14 identifies subsystem SSN2 messages from global title translation for transmission to processing nodes according to a destination group table for subsystem SSN2. The sequential transmission technique occurs as previously discussed with message transmission prevented to a particular processing node when it has reached its message allocation.

A failure can occur at a processing node, a message path, or a subsystem. For failures at a processing node or a message path, messages are dynamically re-distributed to the remaining operational processing nodes. Reallocation of messages occurs for each subsystem at the failed processing node or doing the failed message path. For failure of a subsystem of a processing node, only messages destined for the failed subsystem of a processing node are reallocated to operating subsystems at other processing nodes. Non-failed subsystems at a processing node having a failed subsystem continue to receive messages for appropriate processing.

Thus, it is apparent that there has been provided a system and method of message distribution in a telecommunications network that satisfy the advantages set forth above. Although the present invention has been described in detail, it should be understood that various changes, substitutions, and alterations may be readily apparent to those skilled in the art and may be made herein without departing from the spirit and scope of the present invention as defined by the following claims.

What is claimed is:

1. A method of message distribution in a telecommunications network, comprising steps of:
    assigning a message allocation to each of a plurality of subsystems within each of a plurality of processing nodes, each subsystem within its associated processing node defining a different service handled by its associated processing node;
    equally distributing messages to each of the plurality of subsystems according to a service associated with each message;
    tracking a number of messages distributed to each of the plurality of subsystems;
    preventing distribution of messages to a particular subsystem in response to reaching its assigned message allocation according to a service the particular subsystem defines;
    equally distributing messages according to a service associated with each message to remaining subsystems that have not reached their respective assigned message allocations.

2. The method of claim 1, wherein the messages are distributed in message sets, and further comprising a step of:
    resetting the tracking of the number of messages distributed to each of the plurality of subsystems after each message set in order to distribute messages from a subsequent message set.

3. The method of claim 1, further comprising steps of:
    determining whether each of the plurality of subsystems is available for message distribution;
    adjusting the message allocation for all available processing nodes and subsystems in response to an identification of unavailable processing nodes and subsystems.

4. The method of claim 3, further comprising a step of:
    readjusting the message allocation for all available subsystems in response to identification of an available subsystem previously identified as unavailable.

5. The method of claim 1, further comprising a step of:
    sequentially selecting the plurality of subsystems for message distribution for a given service.

6. The method of claim 5, further comprising steps of:
    determining whether a selected subsystem is available for message distribution;
    incrementing a transport counter associated with the selected subsystem in response to availability of the selected subsystem.

7. The method of claim 5, further comprising steps of:
    determining whether a selected subsystem is available for message distribution;
    incrementing a failure counter associated with the selected subsystem in response to unavailability of the selected subsystem.

8. The method of claim 5, further comprising steps of:
    determining whether any of the plurality of subsystems are available for message distribution for the given service;
    incrementing a group counter in response to unavailability of all of the plurality of subsystems for the given service.

9. A method of message distribution in a telecommunications network, comprising steps of:
    assigning a message allocation to each of a plurality of processing nodes and to each subsystem within each of the plurality of processing nodes;
    equally distributing messages to each of the plurality of processing nodes and subsystems;
    tracking a number of messages distributed to each of the plurality of processing nodes and subsystems;
    preventing distribution of messages to a particular processing node in response to reaching its assigned message allocation;
    equally distributing messages to remaining processing nodes and subsystems that have not reached their respective assigned message allocations;
    determining whether each of the plurality of processing nodes and subsystems is available for message distribution;
    adjusting the message allocation for all available processing nodes and subsystems in response to an identification of unavailable processing nodes and subsystems, wherein the readjusting step includes altering a traffic load for each available processing node and subsystem according to a following equation:

$$Z = (X*Y)/(T1*T2)$$

where Z is a percent of traffic load to be added to a current traffic load of a particular available processing node,
   X is a total message allocation of all unavailable processing nodes,
   Y is the message allocation of the particular available processing node,
   T1 is a total message allocation of all of the plurality of processing nodes, and
   T2 is a total message allocation of all available processing nodes.

10. A method of message distribution in a telecommunications network, comprising steps of:
    assigning a message allocation to each of a plurality of processing nodes and to each subsystem within each of the plurality of processing nodes;
    equally distributing messages to each of the plurality of processing nodes and subsystems;
    tracking a number of messages distributed to each of the plurality of processing nodes and subsystems;
    preventing distribution of messages to a particular processing node in response to reaching its assigned message allocation;

equally distributing messages to remaining processing nodes and subsystems that have not reached their respective assigned message allocations;

partitioning the plurality of processing nodes and subsystems into primary and secondary processing nodes and subsystems;

assigning a non-zero message allocation to each of the primary processing nodes and subsystems;

assigning a zero message allocation to each of the secondary processing nodes and subsystems.

11. The method of claim 10, further comprising steps of:

sequentially selecting the primary processing nodes and subsystems for message distribution;

determining whether a selected primary processing node and subsystem is available for message distribution;

adjusting message distribution among the secondary processing nodes and subsystems according to the message allocation of the selected primary processing node and subsystem in response to unavailability of the selected primary processing node and subsystem.

12. The method of claim 11, further comprising a step of:

dividing the message allocation of the unavailable selected primary processing node and subsystem approximately equally among the secondary processing nodes and subsystems.

13. The method of claim 11, further comprising steps of:

readjusting message distribution back to the selected primary processing node and subsystem in response to the selected primary processing node and subsystem becoming newly available.

14. The method of claim 11, further comprising steps of:

determining whether all secondary processing nodes and subsystems are available for message distribution;

adjusting message distribution among available secondary processing nodes and subsystems according to the message allocation of the selected primary processing node and subsystem.

* * * * *